United States Patent [19]

Machino et al.

[11] Patent Number: 4,924,713
[45] Date of Patent: May 15, 1990

[54] TRANSDUCER TO DETECT FORCE WHICH IS APPLIED TO MACHINE TOOL WHEN MACHINING WORKPIECE AND ITS ATTACHING STRUCTURE

[75] Inventors: Toshimichi Machino; Saiji Oda; Kihachirou Toubo; Masahiro Kadosaki, all of Toyama, Japan

[73] Assignees: Elco Co., Ltd.; Toyama-ken, both of Toyama, Japan

[21] Appl. No.: 316,968

[22] Filed: Feb. 28, 1989

[30] Foreign Application Priority Data

Mar. 14, 1988 [JP] Japan .................................. 63-59822
Mar. 14, 1988 [JP] Japan .................................. 63-59823
Mar. 14, 1988 [JP] Japan .................................. 63-59824

[51] Int. Cl.⁵ .......................... G01L 5/16; G01L 1/16; B23Q 17/09
[52] U.S. Cl. .................................. 73/862.06; 73/104; 73/862.68
[58] Field of Search ........... 73/862.06, 862.54, 862.68, 73/104, DIG. 4; 340/680; 310/338, 339

[56] References Cited

U.S. PATENT DOCUMENTS

| 3,464,503 | 9/1969 | Houck | 73/11 X |
|---|---|---|---|
| 3,872,285 | 3/1975 | Shum et al. | 73/104 X |
| 4,499,394 | 2/1985 | Koal | 310/338 X |
| 4,577,510 | 3/1986 | Bur et al. | 173/DIG. 4 |
| 4,741,231 | 5/1988 | Patterson et al. | 173/DIG. 4 |
| 4,807,482 | 2/1989 | Park et al. | 173/862.68 |

FOREIGN PATENT DOCUMENTS 3437246 4/1986 Fed. Rep. of Germany ........ 73/104

Primary Examiner—Charles A. Ruehl
Attorney, Agent, or Firm—Wenderoth, Lind & Ponack

[57] ABSTRACT

A cutting load or a cutting resistance which is applied to a machine tool is detected by using a transducer having a film sheet type piezoelectric sensor. A detection output of the transducer is converted into a voltage signal by a charge amplifier. The transducer is attached to the portion of a feed nut which is moved in the axial direction by a screw shaft, and the cutting load is applied to the transducer. On the other hand, the transducer may be assembled in the portion of the bearing which supports the feed screw shaft so as to detect the cutting load which is applied to the screw shaft. Further, the transducer may be assembled integrally with the tool holder. In order to prevent a drift which occurs in the output of the charge amplifier since a constant assembly load is applied to the transducer having the piezoelectric sensor, two transducers are provided so that the cutting loads are applied in opposite directions to the transducers and the inverted output of one of two charge amplifiers is added to the output of the other charge amplifier.

5 Claims, 12 Drawing Sheets

TRANSDUCER TO DETECT FORCE WHICH IS APPLIED TO MACHINE TOOL WHEN MACHINING WORKPIECE AND ITS ATTACHING STRUCTURE

BACKGROUND OF THE INVENTION

The present invention relates to a transducer to detect a cutting force or cutting resistance which is applied to a machine tool when machining a workpiece and, more particularly, to a transducer to detect a cutting force or cutting resistance by using a piezoelectric sensor and to attaching structure which attaches such a transducer to a machine tool.

In recent years, in association with the practical use of production systems such as FMC, FMS, or the like, a machine tool such as a machining center, NC lathe, or the like has been operated in an automatic manner. In the automatic operation, an in-process monitoring of the cutting state is very desirable to detect the occurrence of an abnormality during the machining of a workpiece. In particular, the measurement of the cutting force and cutting resistance which can indicate such an abnormality is used as such a process.

Hitherto, to measure the cutting force or cutting resistance, methods in which a strain gauge or quartz resonator is assembled in a tool or the like and strain is measured and in which a load current of a motor to drive the main shaft is measured, have been employed.

However, in the strain measuring method, the detector is expensive and the rigidity of the detector itself is low, so that when a large force is applied to the detector, it is easily broken. On the other hand, in the strain measuring method or the motor load current measuring method, when measuring a small cutting force or cutting resistance of a small-diameter drill, a tap, or the like, since the detection sensitivity is so low the detector is influenced by noise or the like. Thus, it is difficult to accurately measure the cutting force or cutting resistance. Such a problem is a large obstacle in carrying out the automatic operation of the machine tool.

SUMMARY OF THE INVENTION

It is an object of the present invention to provide a detecting apparatus having a rigidity that is sufficient to endure a large cutting force and cutting resistance.

Another object of the invention is to provide a transducer which can accurately detect even a small cutting force and cutting resistance by exhibiting a high detection sensitivity and to also provide an attaching structure for attaching such a transducer to a machine tool.

Still another object of the invention is to provide a transducer for detecting a cutting force and cutting resistance by using a piezoelectric sensor and to also provide an attaching structure for attaching such a transducer to a machine tool.

Still another object of the invention is to provide a transducer for use in a machine tool in which an internal measurement in an automatic operation can be properly executed and to also provide an attaching structure for attaching such a transducer to a machine tool.

Still another object of the invention is to provide a transducer which is integrally assembled in a tool holder of a machine tool so that a load which is applied to a cutting tool can be directly and accurately measured.

Still another object of the invention is to provide a transducer having a circuit which can accurately detect a cutting load and cutting resistance without being influenced by the drift of a piezoelectric sensor.

That is, according to the present invention, a tranducer to detect cutting force or a cutting resistance of a machine tool has a piezoelectric sensor of a film sheet type in which electrode layers are formed on both sides of a piezoelectric material layer and has a structure in which a through hole which accommodates a feed screw shaft or the like of the machine tool is formed at the center of the piezoelectric sensor.

Such a transducer is attached to the nut portion of the feed screw shaft to move a work table or a tool table in a machine tool or to the bearing portion of the feed-screw shaft and measures the cutting force and cutting resistance during a cutting operation.

Since the transducer of the present invention uses a film sheet type piezoelectric sensor, it is not damaged even if a large cutting force or a large cutting resistance is applied to the sensor. On the other hand, since the film thickness of the piezoelectric sensor is thin, even if a cutting force or cutting resistance is applied to the sensor, the deformation of the sensor itself is extremely small and does not adversely influence the detection accuracy.

Further, the sensitivity of the transducer can be easily raised by increasing the area of the piezoelectric sensor. By enlarging the area of the piezoelectric sensor, the load per unit area is reduced and the rigidity can be further increased.

On the other hand, since the detection sensitivity is high, a wide measurement range from 1 kgf to 1000 kgf is provided. Even in the case of a small diameter drill or tap generating a small cutting force and cutting resistance, the cutting force and cutting resistance can also be accurately measured.

On the other hand, the transducer of the invention may be provided integrally with the tool holder. That is, an adapter to fix a cutting tool such as drill, tap, or the like is attached to the tool holder which can be freely attached to or detached from the main shaft of the machine tool. A film sheet type piezoelectric sensor is attached to the adapter so as to be subjected to a cutting load in the axial direction.

The piezoelectric sensor may be attached to the bearing portion of the adapter in a state in which the sensor is sandwiched between a pair of thrust bearings to which a load in the axial direction is applied. Further, there is provided a rotation retaining member to stop the rotation of the thrust bearing on the side where the transducer is attached.

Further, the piezoelectric sensor may be divided into four parts in the circumferential direction of the shaft and detects the loads acting along X and Y axes which cross perpendicularly at the shaft by allowing the differences between the detection signals of the divided detecting parts which are symmetrical with respect to the center of the shaft to be calculated.

The signal from the piezoelectric sensor which is used in the transducer of the present invention is converted into a voltage signal by a charge amplifier and is output. When an almost constant load is applied to the piezoelectric sensor for a long time, a drift occurs in which the output voltage of the charge amplifier changes with a lapse in time.

To prevent the drift of the charge amplifier, two transducers are provided in the cutting load detecting mechanism. When the load which is applied to the piezoelectric sensor of one of the two transducers increases, the cutting load detecting mechanism simultaneously reduces the cutting load which is applied to the piezoelectric sensor of the other transducer. The detection outputs of the two transducers are respectively converted into the voltage signals by the charge amplifiers. After the output of one of the charge amplifiers is inverted, the inverted output is added to the output of the other charge amplifier, thereby eliminating the drift. These and other objects, features, and advantages of the present invention will become more apparent from the following description taken in conjunction with accompanying drawings.

DETAILED DESCRIPTION OF PREFERRED EMBODIMENTS

Figure 1:
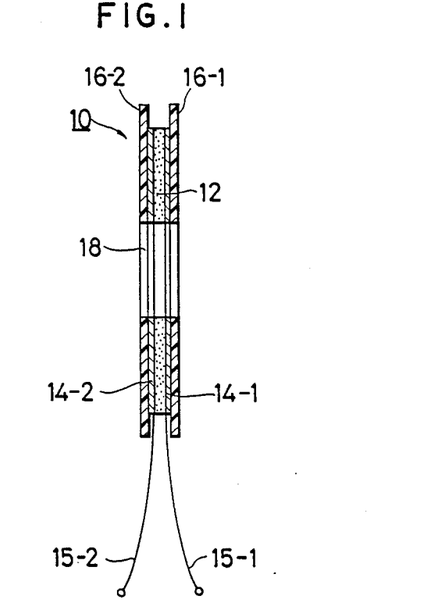
FIG. 1 is a cross-sectional view of an embodiment of a transducer according to the present invention.

In FIG. 1, reference numeral 10 denotes a transducer to detect cutting force or a cutting resistance. The transducer 10 has a piezoelectric material layer 12 comprising a piezoelectric material at the center thereof and electrode layers 14-1 and 14-2 on both sides of the piezoelectric material layer 12. Lead wires 15-1 and 15-2 are led out from the electrode layers 14-1 and 14-2. Insulative sheets 16-1 and 16-2 are fixed to the outsides of the electrode layers 14-1 and 14-2 with an adhesive agent or the like. A film sheet type of piezoelectric sensor is formed by the piezoelectric material layer 12 and electrode layers 14-1 and 14-2. Practically speaking, it is possible to use high molecular piezoelectric material, for instance, PVDF which is known as a piezoelectric film. The piezoelectric device of the film type has a thickness of about 0.2 mm. Even if the Young's modulus is small, deformation when the device is subjected to a load is extremely small. Therefore, as will be clearly understood by the description hereinafter, even when the piezoelectric device is directly assembled in a feed screw mechanism of a machine tool, no decrease in the detecting accuracy occurs due to deformation of the piezoelectric device. Further, since a piezoelectric constant (amount of charge generated per unit force) of the piezoelectric device remains constant irrespective of the area to which a force is applied, by enlarging the area, the load per unit area can be reduced and the rigidity can be increased without reducing the sensitivity.

Figure 2:
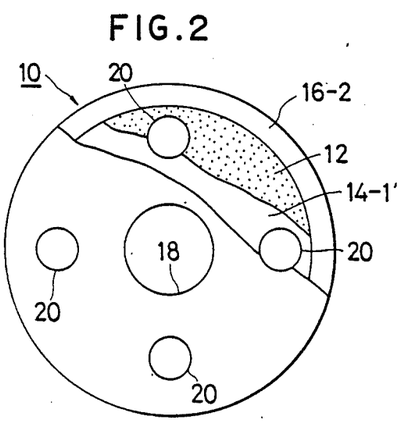
FIG. 2 is a partially cut away plan view of the transducer of FIG. 1.

Further, a through hole 18 for allowing a feed screw shaft or the like of a machine tool to extend therethrough is formed at the center of the transducer 10. In addition, as shown in FIG. 2, bolt through holes 20 to attach and fix the transducer 10 are formed. The number of bolt through holes 20 can be provided as necessary. On the contrary, if no bolt is used, there is no need to form through holes 20.

According to the transducer 10 of the invention shown in FIGS. 1 and 2, by switching capacitance of a capacitor of a charge amplifier to extract a detection output from the transducer 10, a force can be measured over a wide range from 1 kgf to 1000 kgf and a resolution on the order of about 100 gf can be realized.

An attaching structure to attach the transducer 10 of the invention shown in FIGS. 1 and 2 to the machine tool will now be described.

Figure 3:
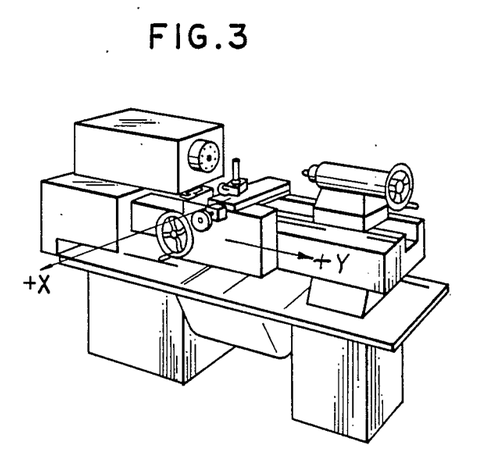
FIG. 3 is a schematic diagram of an NC lathe.
Figure 4:
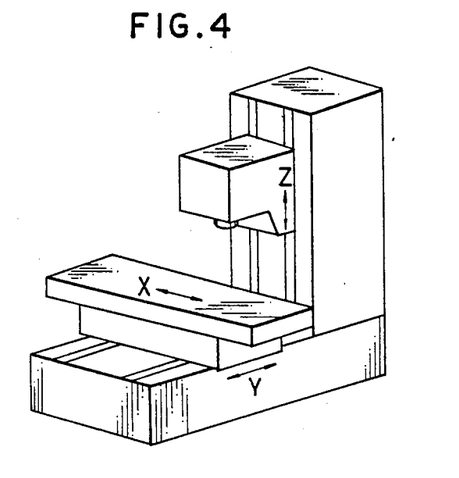
FIG. 4 is a schematic diagram of a vertical type machining center.

First, there are various types of NC machine tools to which the transducer of the invention may be installed, such as an NC lathe shown in FIG. 3 and a vertical type machining center shown in FIG. 4.

In the NC lathe of FIG. 3, the motions to cut a workpiece are executed in two directions along X and Y axes as shown by arrows. On the other hand, in the machining center of FIG. 4, the motions are executed in three directions along X, Y, and Z axes.

In the machining center of FIG. 4 as an example, all of the motions in the directions along the X, Y, and Z axes to cut a workpiece are obtained by transforming the rotation of a pulse motor into rectilinear motions with a ball screw mechanism.

That is, in FIG. 5, the motion in the direction along the Y axis of a saddle 30 which is mounted on a bed 22 so as to be movable in the Y-axis direction is obtained in the following manner. A feed screw shaft 26-1 is rotated by a pulse motor 24-1 attached to the bed 22 and the rectilinear motion of a feed nut 28-1 which is threadingly engaged with the feed screw shaft 26-1 is transferred to the saddle 30. On the other hand, the motion in the direction along the X axis of a work table (not shown) mounted on the saddle 30 is derived in the following manner. A feed screw shaft 26-2 is rotated by a pulse motor 24-2 attached to the saddle 30 and the rectilinear motion of a feed nut 28-2 which is threadingly engaged with the feed screw shaft 26-2 is transferred to the work table.

Further, the motion in the direction along the Z axis of a main shaft head 34 by a column 32 is obtained in the following manner. A feed screw shaft 26-3 is rotated by a pulse motor 24-3 attached to the column 32 and the rectilinear motion of a feed nut 28-3 which is threadingly engaged with the feed screw shaft 26-3 is transferred to the main shaft head 34, thereby moving the head 34 in the Z-axis direction.

Figure 5:
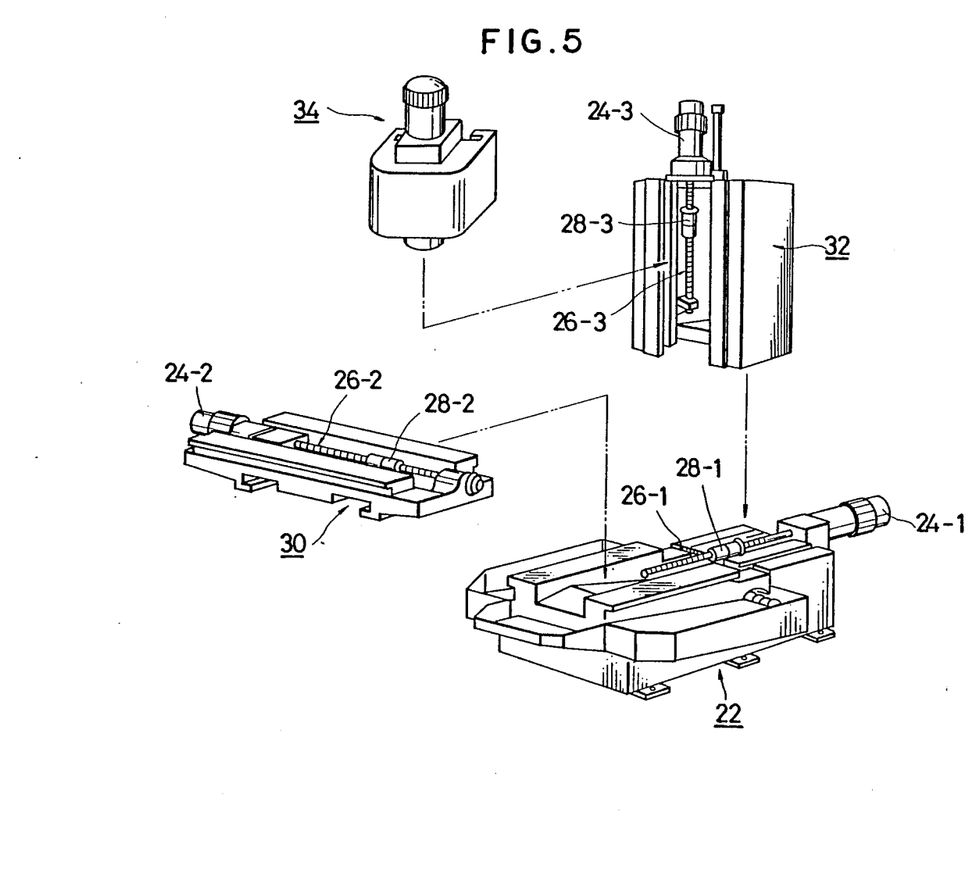
FIG. 5 is an exploded assembly diagram of a ball screw mechanism in the machining center.

As will be obviously understood from an understanding of the transformation of rotary motion into rectilinear motion by the ball screw mechanism shown in FIG. 5, a component force $F_1$ in the axial direction upon machining a workpiece which is applied to the feed screw shafts 26-1 to 26 3 is the sum of a cutting force $F_2$ in each direction and a frictional resistance $F_3$ on the slide surface.

$$F_1 = F_2 + F_3 \quad (1)$$

The transducer 10 of the invention shown in FIGS. 1 and 2 is attached to the machine tool so as to measure the component force $F_1$ in the axial direction of the feed screw shaft in equation (1).

Although the cutting force $F_2$ in equation (1) can be separately measured experimentally, there is a difficult problem in the case where the transducer 10 is assembled to an actual machine and the force is measured. Therefore, in the invention, the force $F_1$ which is the sum of the frictional resistance $F_3$ and the cutting force $F_2$ is measured by the transducer 10. When measuring the cutting force $F_2$ in addition to the frictional resistance $F_3$, since the frictional resistance $F_3$ is also increased or decreased in proportion to the cutting force $F_2$, even if the frictional resistance $F_3$ is included, no problem occurs when the sum of the cutting force $F_2$ and the frictional resistance $F_3$ is measured as the substantial cutting force. Further, since the frictional force $F_3$ is fairly smaller than the cutting force $F_2$, no practical problem occurs.

Figure 6:
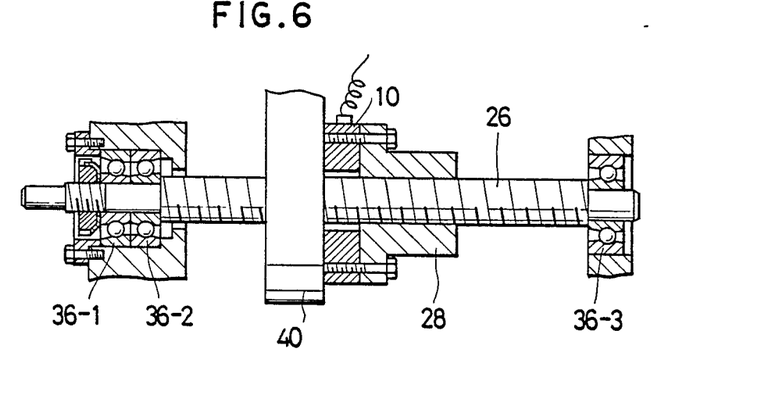
FIG. 6 is a sectional view of a first embodiment of attaching structure according to the invention.

FIG. 6 is an explanatory diagram showing the first embodiment of an attaching structure of the transducer according to the invention.

In FIG. 6, reference numeral 26 denotes a feed screw shaft which is rotated by a pulse motor. The left side of the feed screw shaft 26 is rotatably supported by a ball screw support including a pair of supporting bearings 36-1 and 36 2 which can simultaneously receive both a radial load and a thrust load. An output shaft of the pulse motor is coupled to the end portion of the feed screw shaft 26 located outside of the supporting bearings 36-1 and 36-2. On the other hand, the axial end on the right side of the feed screw shaft 26 is rotatably supported by a ball bearing 36-3. A feed nut 28 is threadingly engaged with the feed screw shaft 26.

The transducer 10 of the invention shown in FIGS. 1 and 2 is attached to the feed nut 28 which is threadingly engaged with the feed screw shaft 26. That is, the doughnut shaped transducer 10 shown in FIGS. 1 and 2 is attached to the left end surface of the feed nut 28. A coupling portion 40 which is coupled with the work table or machining table is fitted to the outside of the transducer 10, thereby fastening and fixing the transducer 10 to the feed nut 28 with bolts.

The measurement of the cutting force will now be described.

First, in the state in which the transducer 10 is fastened and fixed to the feed nut 28 by the coupling portion 40 shown in FIG. 6, a fixed load is applied to the transducer 10 due to the fastening. A detection output of the transducer 10 is input to the charge amplifier. Upon reception of the detection output from the transducer 10 due to the fixed load, the capacitor provided in a feedback circuit of the charge amplifier assumes a charging state. In the state prior to measurement, the charge amplifier has already generated the output. Therefore, prior to measurement, the capacitor provided in the feedback circuit of the charge amplifier is discharged and reset, thereby initializing the output of the charge amplifier.

In this state, when the feed screw shaft 26 is rotated by the pulse motor and the feed nut 28 is moved in a predetermined direction, the work table or tool table starts moving through the coupling portion 40 attached to the feed nut 28 through the transducer 10. As a result of the movement in the lateral (right/left) direction of the feed nut 28 due to the rotation of the feed screw shaft 26, the cutting resistance from the work table or the cutting force from the tool table is applied to the transducer 10 sandwiched between the coupling portion 40 and the feed nut 28.

In the embodiment of FIG. 6, since the transducer 10 is fixed to the left side of the feed nut 28, when the feed screw shaft 26 is rotated so as to move the work table or tool table to the right by the feed nut 28, the compressing force which is applied from the coupling portion 40 to the transducer 10 decreases. On the contrary, when the feed screw shaft 26 is rotated so as to move the feed nut 28 to the left, the compressing force which is applied from the coupling portion 40 to the transducer 10 increases. The decrease or increase in the compressing force which is applied to the transducer 10 in such a case is proportional to the cutting force or cutting resistance. Therefore, the increase or decrease in the magnitude of charge, which is proportional to the compressing force applied to the transducer 10, is converted into the voltage signal by the charge amplifier. Thus, a voltage signal whose polarity differs depending on the moving direction of the feed nut 28 and which is proportional to the cutting force or cutting resistance can be obtained.

Figure 7:
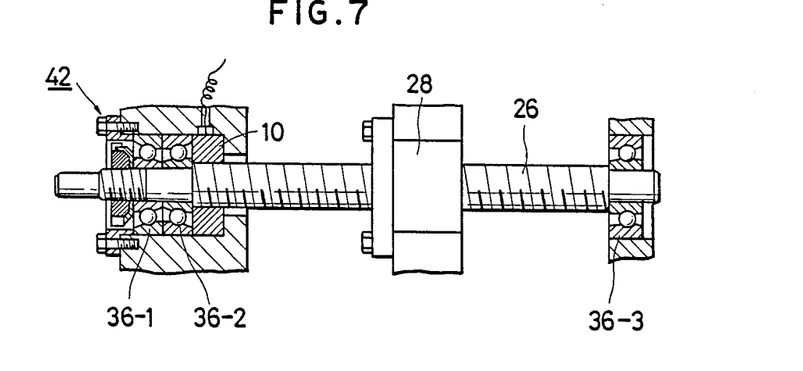
FIG. 7 is a sectional view of a second embodiment of attaching structure according to the invention.

FIG. 7 is a sectional view of the second embodiment of a transducer attaching structure of the invention. The second embodiment is characterized in that the transducer is attached to a ball screw supporting bearing of the feed screw shaft.

In FIG. 7, the feed screw shaft 26 which is threadingly engaged with the feed nut 28 coupled with the work table or tool table is mounted. in a manner in which the axial left end is rotatably supported by the pair of supporting bearings 36-1 and 36-2 assembled into a bearing portion 42 and the axial right end is rotatably supported by the ball bearing 36-3. The transducer 10 is attached to the ball screw supporting bearing portion 42 into which the supporting bearings 36-1 and 36-2 are assembled.

Figure 8:
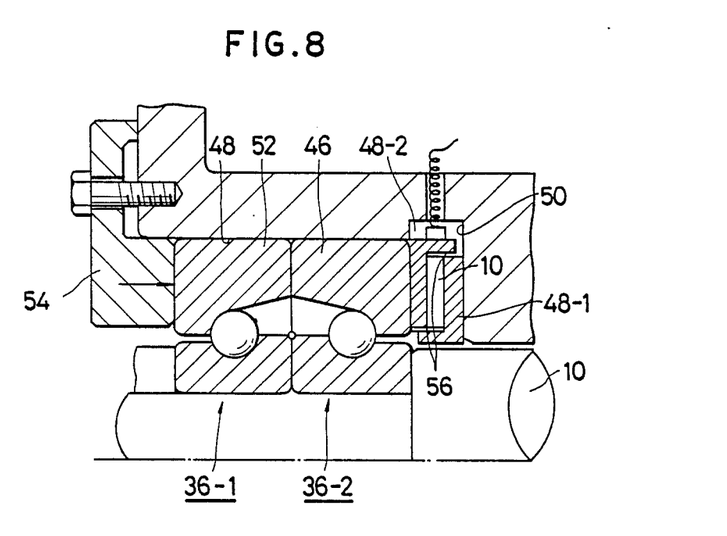
FIG. 8 is an enlarged view of the bearing portion shown in FIG. 7.

That is, as shown in FIG. 8, the transducer 10 is assembled between the supporting bearing 36-2 and a surface 50 defining a bearing hole 48. Practically speaking, the transducer 10 is assembled between an outer ring 46 of the supporting bearing 36-2 and the surface 50 defining the bearing hole 48 in a state in which the transducer is sandwiched by a pair of spacer rings 48-1 and 48-2. An outer ring 52 of the supporting bearing 36-1 assembled to the outside of the bearing hole 48 is fixed by fastening a metal fitting 54 in the bearing portion with a bolt. Thus, the transducer 10 is fastened and fixed under a predetermined load. On the other hand, each of the spacer rings 48-1 and 48-2 between which the transducer 10 is sandwiched has an L-shaped cross section. 0-rings 56 seal the transducer 10 and are interposed between the slide surfaces on the inside and outside of the spacer rings.

In such a transducer attaching structure of FIGS. 7 and 8, the cutting resistance from the work table or the cutting force from the tool table generated during a cutting operation acts in the axial direction of the feed screw shaft 26 due to the movement in the lateral direction of the feed nut 28 under the rotation of the feed screw shaft 26. Such resistance or force is applied to the transducer 10 sandwiched between the spacer rings 48-1 and 48-2 through the outer ring 46 of the supporting bearing 36-2 provided in the bearing portion 42.

Practically speaking, when the load corresponding to the cutting force or cutting resistance acting in the left direction is applied to the feed screw shaft 26, the compressing force of the transducer 10 is reduced. When the load corresponding to the cutting force or cutting resistance acting in the right direction is applied to the feed screw shaft 26, the compressing force of the transducer 10 contrarily increases. When the cutting work is started, the capacitor provided in the feedback circuit of the charge amplifier to extract the detection output of the transducer 10 is discharged and reset and its voltage output is initialized. Therefore, the output voltage whose polarity differs in accordance with the moving direction of the feed nut 28 and which is proportional to the cutting force or cutting resistance which is applied to the feed screw shaft 26 can be extracted.

Figure 9:
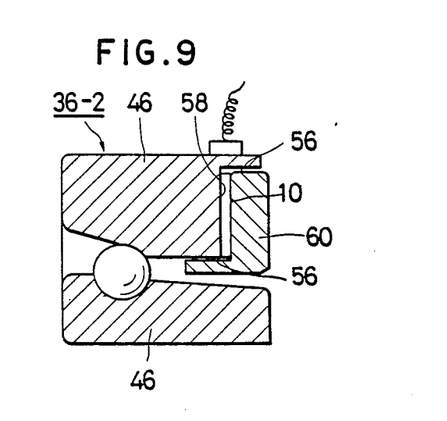
FIG. 9 is a diagram of attaching structure of the present invention in which a transducer is assembled integrally with a supporting bearing.

FIG. 9 is a cross-sectional view of another assembling structure in which the transducer 10 is assembled in the bearing portion 42 of the feed screw shaft 26 shown in FIGS. 7 and 8.

That is, in the embodiment of FIGS. 7 and 8, a space to accommodate the transducer 10 must be formed adjacent the bearing hole 48 accommodating the supporting bearings 36-1 and 36-2 and thus, the design of the bearing portion must be changed only with respect to providing such a space. Therefore, the structure of FIG. 9 is designed so that the transducer 10 can be attached without changing the bearing hole 48.

That is, in the embodiment of FIG. 9, the right end of the outer ring 46 of the supporting bearing 36-2 is cut out to form a transducer enclosing portion 58. The transducer 10 is assembled in the enclosing portion 58 and an L-shaped spacer ring 60 is fixed to the transducer 10 from outside the outer ring 46. The 0-rings 56 seal the transducer 10 and are provided on the contact surfaces on the inside and outside of the spacer ring 60.

In the attaching structure of FIG. 9, since the transducer 10 can be assembled integrally with the supporting bearing 36-2, there is no need to additionally provide the installation space for the transducer 10 adjacent the bearing hole 48 as shown in FIG. 8 and thus, such a structure is more practical.

Although the above embodiment has been described with respect to the case where the transducer is assembled into the feed screw mechanism of the work table or tool table, the transducer can be also similarly assembled to the feed nut or supporting bearing of the feed screw mechanism of the main shaft system.

Figure 10:
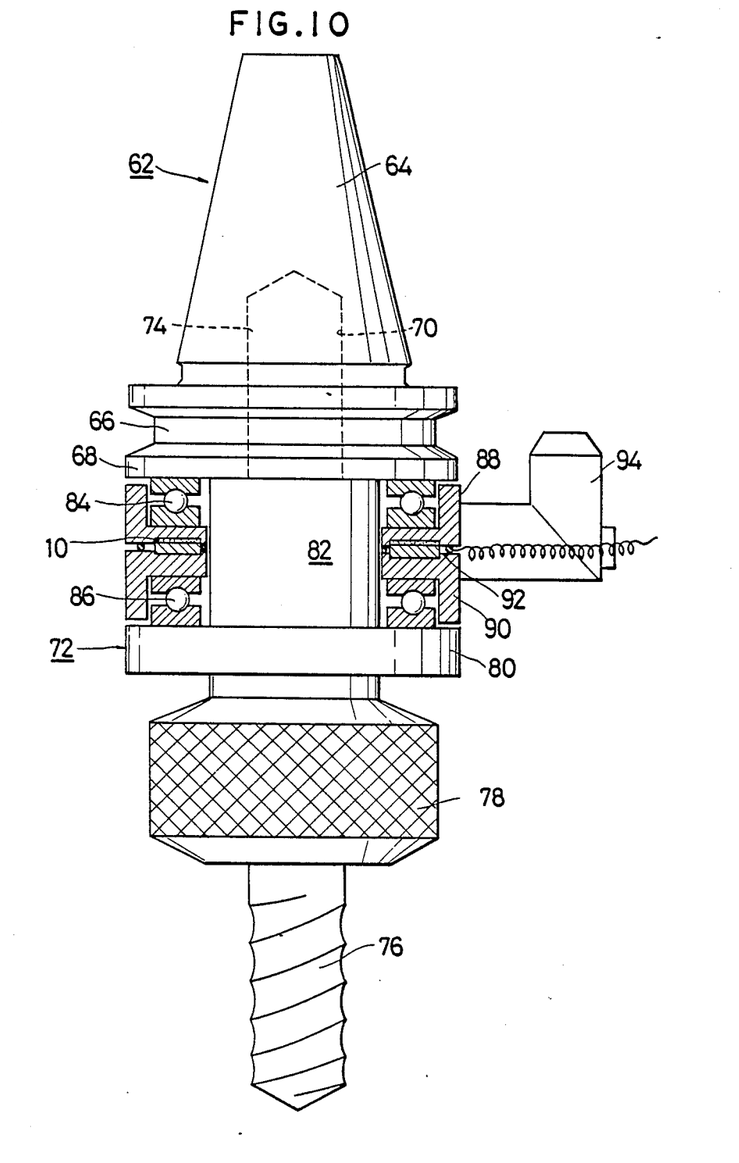
FIG. 10 is a partial sectional view of a transducer integrally assembled with a tool holder according to the invention.

FIG. 10 is a partial sectional view of a transducer integrally assembled with a tool holder.

In FIG. 10, reference numeral 62 denotes a tool holder. A tapered shaft portion 64 is formed on the main shaft attached side of the tool holder. A flange 68 having a flange groove 66 is formed on the front of the tool holder. A tool attaching hole 70 shown by a broken line extends in the axial direction from the center of the lower edge surface of the flange 68. The tool holder 62 has dimensions and a shape based on, for instance, MAS standards or the like and can be attached to and detached from the main shafts of all of the machine tools as a standard article.

Adjacent the tool holder 62 is an adapter 72 for securing therein the transducer which detects the cutting load. In the upper portion of the adapter 72, an attaching shaft 74 adapted to be inserted into the tool attaching hole 70 of the tool holder 62 is integrally formed. On the other hand, a chuck 78 to secure a cutting tool, for instance, a drill bit 76, is fixed to the lower portion of the adapter 72. Although the adapter 72 can be formed integrally with the chuck 78, in order to enable the adapter 72 to be used as a standard article for all of the cutting tools, it is desirable to provide a tool attaching member such as the chuck 78 or the like that is detachable from the adapter 72. It is obviously possible to directly attach the cutting tool such as the drill bit 76 or the like to the adapter 72 without providing the chuck 78.

The adapter 72 has a flange 80 on the drill attaching side and also has a shaft portion 82 having small diameter adjacent the flange 80. A bearing portion for securing the transducer 10 therein is formed by the flange 80 and shaft portion 82 of the adapter 72 and. further by the flange 68 of the tool holder 62.

A pair of thrust bearings 84 and 86 are assembled in the axial direction into the bearing portion 82 between the flange 68 of the tool holder 62 and the flange 80 of the adapter 72. The transducer 10 comprising the film sheet type piezoelectric sensor is sandwiched and attached between the thrust bearings 84 and 86 through spacer rings 88 and 90 and, further, through a swasher ring 92. Moreover, a rotation retaining member 94 is attached to the outer peripheries of the spacer rings 88 and 90, between which the transducer 10 is sandwiched and fixed between the thrust bearings 84 and 86 through the swasher ring 92. The rotation retaining member 94 restricts the rotation of the spacer rings 88 and 90 and allows the spacer rings 88 and 90 to move freely in the axial direction.

Figure 11:
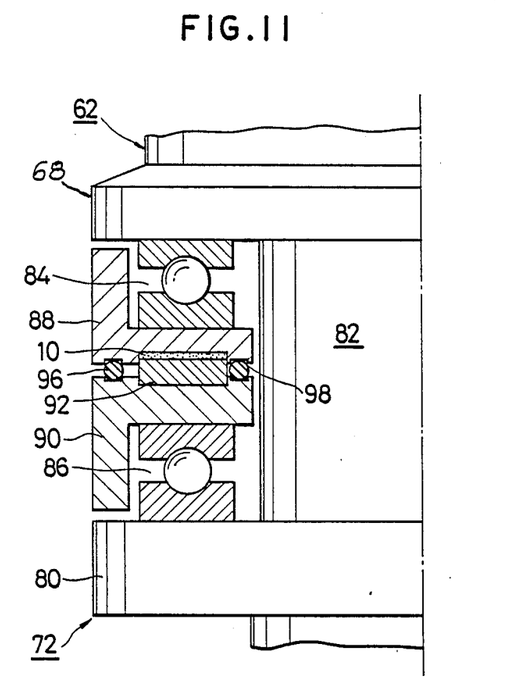
FIG. 11 is an enlarged view of an attaching portion of the transducer in FIG. 10.

FIG. 11 is an enlarged view of the transducer attaching portion in FIG. 10.

In FIG. 11, around the shaft portion 82 extending between the flanges 68 and 80 due to the attachment of the adapter 72 to the tool holder 62, the spacer rings 88 and 90 are disposed between the thrust bearings 84 and 86. The transducer 10 is sandwiched between the spacer rings 88 and 90 through the swasher ring 92. 0-rings 96 and 98 are provided on both sides of the transducer 10 sandwiched between the spacer rings 88 and 90 through the swasher ring 92, thereby sealing the transducer 10.

In such an attaching structure in which the transducer 10 is attached to the adapter 72, even if the tool holder 62 and adapter 72 are rotated by the main shaft of the machine tool, since rotation of the spacer rings 88 and 90 is prevented by the rotation retaining member 94 as shown in FIG. 10, the transducer 10 is not rotated.

On the other hand, the cutting load generated during the cutting operation by the drill bit 76 or the like attached to the tip of the adapter 72 acts in the axial direction of the adapter 72. The cutting load is applied to the transducer 10 sandwiched between the flange 80 of the adapter 72 and the flange 68 of the tool holder 62 through the thrust bearings 84 and 86 and, further, through the spacer rings 88 and 90 and swasher ring 92, so that the cutting load can be measured.

That is, prior to cutting, by discharging and resetting the capacitor provided in the feedback circuit of the charge amplifier to which the detection output of the transducer 10 was input, the signal voltage corresponding to the cutting load in the axial direction which is applied from the charge amplifier to the transducer 10 due to the start of the cutting operation is obtained.

Therefore, when the cutting resistance increases due to the abrasion of the blade of the drill bit 76 or when the drill bit 76 is broken, since the detection signal of the abnormal cutting load is obtained, a proper countermeasure can be taken by a processor or the like on the basis of the detection signal. Further, since the detection signal corresponding to the cutting load and output by the transducer 10 has sufficient resolution, it is also possible to provide a reference pattern of a predetermined cutting load that is determined in accordance with the desired progression of the machining operation and to execute a feedback control that adjusts the actual cutting load to the reference pattern.

Figure 12:
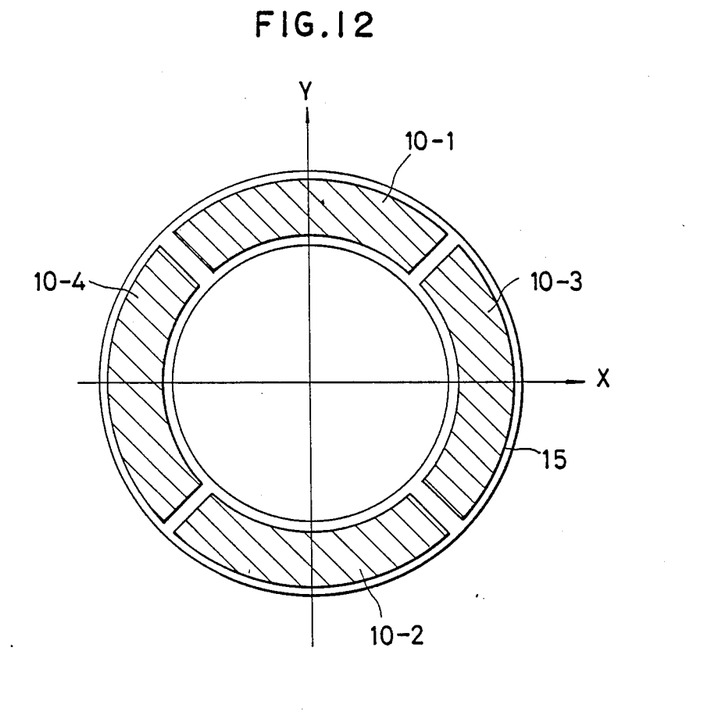
FIG. 12 is a cross-sectional view of another transducer structure which can be attached to the tool holder in FIG. 10.

FIG. 12 shows another embodiment of the transducer 10 which is attached to the adaptor 72 in FIG. 10. The second embodiment is characterized in that the transducer 10 is divided into four transducers 10-1 to 10-4 around the periphery of the shaft.

Assuming that the X and Y coordinates which cross perpendicularly in the axial direction are set as shown in FIG. 12, the transducers 10-1 and 10-2 are arranged along the Y axis with respect to the coordinate center and the transducers 10-3 and 10-4 are arranged along the X axis with respect to the coordinate center, respectively.

By dividing the transducer 10 into the four transducers 10-1 to 10-4 as mentioned above, in addition to detecting the load acting in the axial direction, that is, in the Z-axis direction, the loads acting in the directions of the Y and X axes can be also detected.

The load in the Z-axis direction can be detected by obtaining the sum or average of the detection signals of the transducers 10-1 to 10-4. On the other hand, the load in the Y-axis direction can be detected by calculating the difference between the detection signals of the transducers 10-1 and 10-2. Moreover, the load in the X-axis direction can be detected by calculating the difference between the detection signals of the transducers 10-3 and 10-4.

Figure 13:
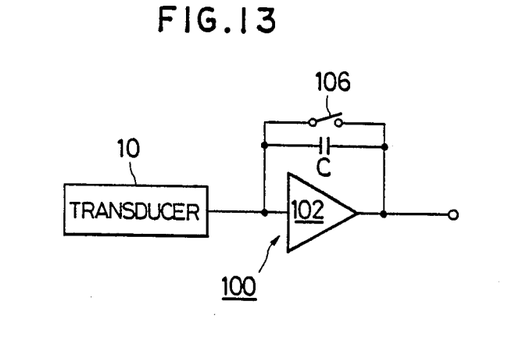
FIG. 13 is a circuit diagram of a transducer circuit using a piezoelectric sensor and a charge amplifier.

FIG. 13 shows a transducer detecting circuit of the invention.

In FIG. 13, the transducer 10 has a piezoelectric sensor as shown in FIGS. 1 and 2. The charges according to the load which is applied to the piezoelectric sensor are generated between the electrodes by the transducer 10. Therefore, a charge amplifying circuit 100 is provided as an external circuit in order to convert the generated charges corresponding to the load applied to the piezoelectric sensor into the voltage signal.

In the charge amplifying circuit 100, a capacitor C is connected to a feedback circuit of an operational amplifier 102. Since an amount $q_x$ of generated charges changes in accordance with the load, the piezoelectric sensor of the transducer 10 can be regarded as a variable capacitor $C_x$.

Assuming that an amplification factor A of the operational amplifier 102 is infinite, the generated charge amount $q_x$ of the piezoelectric sensor is directly transferred to the feedback capacitor C by an imaginary short operation of the operational amplifier 102, so that an output voltage $E_0$ which is proportional to the generated charge amount $q_x$ of the piezoelectric sensor can be ideally obtained. However, actually, since the amplification factor of the operational amplifier 102 is not infinite, the output voltage $E_0$ is as follows.

$$E_0 = -q_x/C$$

Further, a reset switch 106 is connected to the feedback circuit of the operational amplifier 102 in parallel with the capacitor C. That is, since a predetermined assembling load has already been applied to the piezoelectric sensor of the transducer 10 in the initial state, prior to detecting the load, the capacitor C is discharged and reset and the output voltage is set to zero.

Figure 14:
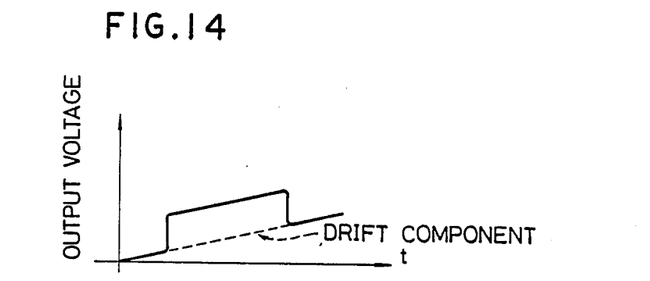
FIG. 14 is a signal waveform diagram showing a drift of an output voltage which is caused in the transducer circuit of FIG. 13.

However, in such charge amplifying circuit 100, as shown in FIG. 14, a drift in which the output voltage $E_0$ of the charge amplifying circuit 100 changes with an elapse of time becomes a problem, so that the load cannot be accurately detected.

That is, the drift occurs in the case where the charges generated between the electrodes of the piezoelectric sensor provided in the transducer 10 are amplified and converted into the voltage signal by the charge amplifying circuit 100, since an input impedance of the charge amplifying circuit 100 cannot be set to be infinite, and thus, the charges generated by the piezoelectric sensor leak through the input impedance the output fluctuates.

Although such a drift does not cause a problem in the case of detecting the AC component such as a vibration or the like, it becomes a large problem when the DC component such as a cutting load is detected.

Therefore, when the load is detected by the transducer using the piezoelectric sensor, since drift does not occur with respect to a phenomenon such as a vibration or the like having a very short period, such a transducer is effectively used to measure the force such as a vibration or the like. However, the detection accuracy cannot be guaranteed with respect to a phenomenon in which an almost constant load is applied for a relatively long time (phenomenon which continues for one second or longer).

Figure 15:
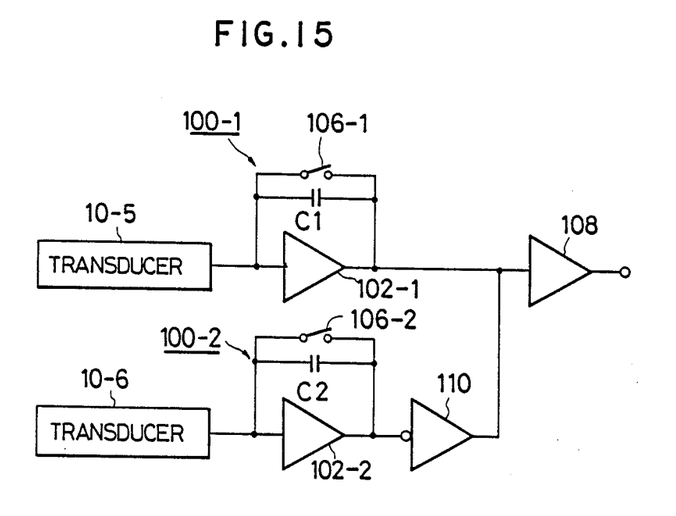
FIG. 15 is a circuit diagram of a transducer circuit of the invention to prevent the drift.
Figure 16:
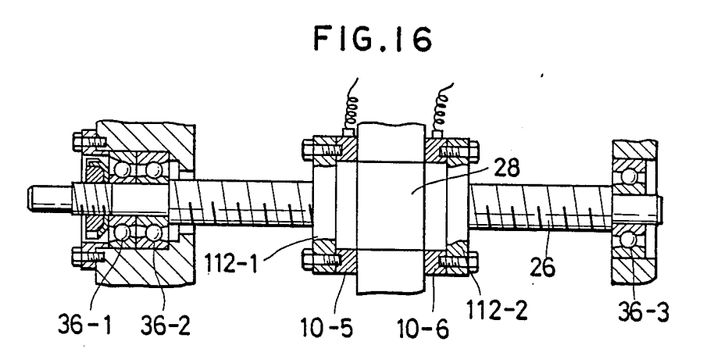
FIG. 16 is a sectional view of a load detecting mechanism to prevent the drift.

FIG. 15 shows a charge amplifying circuit of the present invention to solve the problem associated with the drift which occurs when a constant load is applied to the transducer. The charge amplifying circuit uses a load detecting mechanism having two transducers as shown in FIG. 16.

In FIG. 15, reference numerals 10-5 and 10-6 denote transducers each having the film sheet type piezoelectric sensor shown in FIGS. 1 and 2. The transducers 10-5 and 10-6 are assembled to a load detecting mechanism shown in FIG. 16. When a cutting load is applied to the transducers, for instance, the cutting load is applied to the transducer 10-5 in such a direction as to increase the assembly load. On the contrary, the cutting load is applied to the transducer 10-6 in such a direction as to reduce the assembly load.

Outputs of the transducers 10-5 and 10-6 are input to charge amplifying circuits 100-1 and 100-2. The charge amplifying circuits 100-1 and 100-2 have operational amplifiers 102-1 and 102-2. Capacitors $C_1$ and $C_2$ are connected to the feedback circuits of the operational amplifiers 102-1 and 102-2. Further, reset switches 106-1 and 106-2 to discharge and reset the capacitors $C_1$ and $C_2$ are connected in parallel therewith.

The principle behind the charge amplifying circuits 100-1 and 100-2 will now be described hereinbelow with respect to the side of, for instance, the charge amplifying circuit 100-1 as an example.

Since the piezoelectric sensor of the transducer 10-5 generates the charges in the amount of $q_x$ corresponding to the load which is applied, it can be regarded as the variable capacitor $C_x$.

When it is assumed that an input voltage of the operational amplifier 102-1 is $E_i$, an output voltage is $E_0$, an amplification factor is A, and an amount of charge of the feedback capacitor is $q_1$, the following relational equations are established.

$$E_0 = -A \cdot E_i$$

$$E_i - E_0 = q_1/C_1$$

$$E_i = (q_x - q_1)/(C_x + C_3)$$

$C_3$ denotes a signal cable capacitance between the transducer 10-5 and the charge amplifying circuit 100-1.
From the above equations, $$q_x = q_1 \cdot \{1 + (C_x + C_3)/C_1(1+A)\}$$

$$E_i = q_1/C_1 \cdot 1/(1+A)$$

$$E_0 = -q_1/C_1 \cdot A/(1+A)$$

Since the amplification factor A of the operational amplifier 102-1 is larger than 1, $$q_x = q_1$$

$$E_i = 0$$

$$E_0 = -q_1/C_1$$

Therefore, the input voltage $E_i$ of the operational amplifier 102-1 is held to almost 0 V. The charges generated in the piezoelectric sensor of the transducer 10-5 are all stored in the feedback capacitor $C_1$. The output voltage $E_0$ of the charge amplifying circuit 100-1 is unconditionally determined by the ratio of the capacitance of the feedback capacitor $C_1$ and the amount $q_x$ of charges generated by the piezoelectric sensor.

The principle behind the charge amplifying circuit 100-1 is also similar to that behind the charge amplifying circuit 100-2 provided for the transducer 10-6.

An output of the charge amplifying circuit 100-1 to convert and amplify the charges generated in the piezoelectric sensor provided in the transducer 10-1 into the voltage signal is input to an adding circuit 108. On the other hand, an output of the charge amplifying circuit 100-2 to convert and amplify the charges generated in the piezoelectric sensor provided in the transducer 10-6 is inverted by an inverting circuit 110. Thereafter, the inverted output is input to the adding circuit 108. Thus, the adding circuit 108 outputs a signal in which the inverted output of the charge amplifying circuit 100-2 has been added to the output of the charge amplifying circuit 100-1.

FIG. 16 shows a load detecting mechanism having the transducers 10-5 and 10-6 shown in the embodiment of FIG. 15.

In FIG. 16, the right end of the feed screw shaft 26 is rotatably supported by the ball bearing 36-3 and the left end is rotatably supported by the pair of supporting bearings 36-1 and 36-2 to which both the radial load and the thrust load are applied. An output shaft of a pulse motor (not shown) is coupled with the axial end of the feed screw shaft 26 projecting from the supporting bearings 36-1 and 36-2. The feed nut 28 is threadingly engaged with the feed screw shaft 26. The transducers 10-5 and 10-6 are arranged at both ends of the feed nut 28. The transducers 10-5 and 10-6 are fastened and fixed to the nut member 28 by presser metal fittings 112-1 and 112-2 fastened with bolts.

Figure 17:
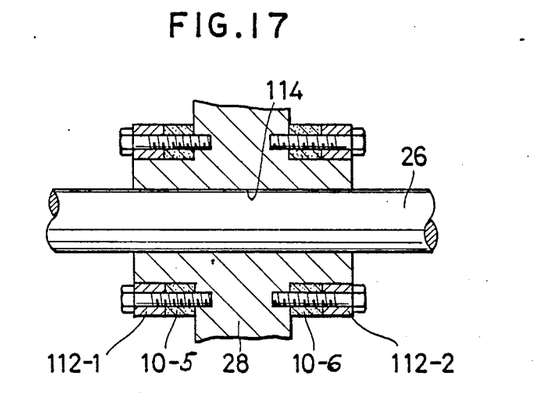
FIG. 17 is a cross sectional view of a nut portion in FIG. 16.

FIG. 17 is an enlarged view of the portion of the feed nut 28 attached to the feed screw shaft 26 in FIG. 16.

In FIG. 17, the feed nut 28 has a screw hole 114 which is in threaded engagement with the feed screw shaft 26. The transducers 10-5 and 10-6 are fitted to the shaft portions on both sides of the feed nut 28. The presser metal fittings 112-1 and 112-2 are fitted onto the transducers 10-5 and 10-6 from outside the feed nut, thereby fastening and fixing the transducers to the feed nut 28 by being fastened to the feed nut with bolts.

In such a load detecting mechanism shown in FIGS. 16 and 17, the sides of the presser metal fittings 112-1 and 112-2 to fasten and fix the transducers 10-5 and 10-6 to the feed nut 28 are coupled to the work table or tool table of the machine tool. Thus, by rotating the feed screw shaft 26 by the pulse motor, the rotational motion is transformed into the rectilinear motion in the lateral direction by the feed nut 28, thereby moving the work table or tool table through the presser metal fittings 112-1 and 112-2.

Assuming for instance, that the feed screw shaft 26 is rotated so as to move the feed nut 28 to the right, the load in the axial direction which is applied to the transducer 10-5 arranged on the right side of the feed nut 28 through the work table or tool table, in correspondence with the cutting load, acts in such a direction as to increase the fastening load on the transducer 10-6. At the same time, such a load in the axial direction contrarily acts to decrease the fastening load on the transducer 10-5 attached on the left side of the feed nut 28. On the other hand, when the feed screw shaft 26 is rotated so as to move the feed nut 28 to the left, the load acts on the piezoelectric sensor of the transducer 10-5 on the left side in such a direction as to increase the fastening load. At the same time, the load in the axial direction acts on the transducer 10-6 on the right side in such a direction as to reduce the fastening load.

Figure 18:
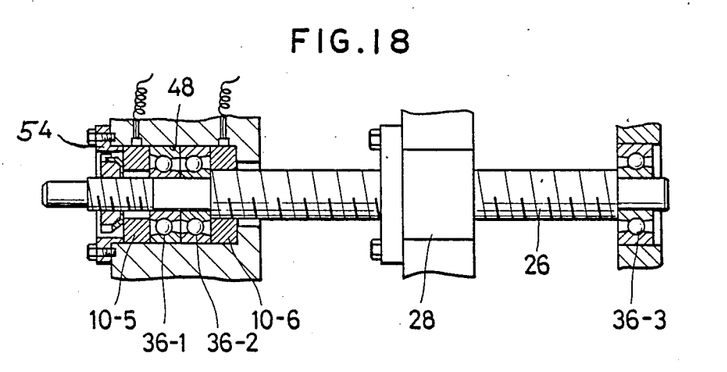
FIG. 18 is a sectional view of another embodiment of a load detecting mechanism to prevent the drift.

FIG. 18 shows a load detecting mechanism having the transducers 10-5 and 10-6 shown in FIG. 15.

In FIG. 18, the transducers 10-5 and 10-6 are assembled into the portions of the supporting bearings 36-1 and 36-2 which rotatably support the feed screw shaft 26 and to which thrust loads are applied. That is, the transducer 10-5 is assembled to the left side of the supporting bearing 36-1 within the bearing hole 48. The transducer 10-6 is assembled to the right side of the supporting bearing 36-2. The presser metal fitting 54 is fastened and fixed to the bearing hole 48 from the outside thereof with bolts.

The pressing forces are transmitted through the side surfaces of the outer rings of the supporting bearings 36-1 and 36-2 to the transducers 10-5 and 10-6. Since the inner ring is fitted onto the side of the feed screw shaft 26 and is rotated, it is disposed so as not to contact the transducers 10-5 and 10-6. The right end of the feed screw shaft 26 is rotatably supported by the ball bearing 36-3. The feed nut 28 to transform the rotational motion of the feed screw into rectilinear motion is threadingly engaged with the feed screw shaft 26.

The operation of the embodiment of FIG. 15 will now be described with reference to FIGS. 19A to 19D.

Figures 19A, 19B:
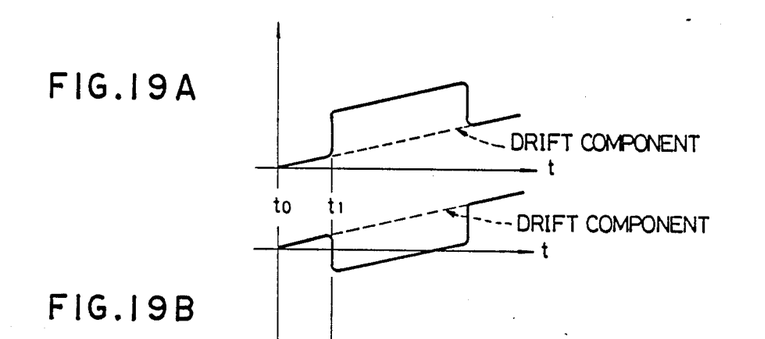
FIGS. 19A, 19B, 19C, and 19D are signal waveform diagrams showing the operation of the circuit in FIG. 16.

FIG. 19A shows the output voltage of the charge amplifying circuit 100-1 to convert and amplify the charges generated in the transducer 10-5. FIG. 19B shows the output voltage of the charge amplifying circuit 100-2 to convert and amplify the charges generated in the transducer 10-6. FIGS. 19A and 19B show the cases in which the cutting load is applied to the transducer 10-5 in such a direction as to increase the cutting load and the cutting load is applied to the transducer 10-6 in such a direction as to decrease the cutting load.

First, the reset switches 106-1 and 106-2 provided in the charge amplifying circuits 100 1 and 100-2 are turned on until time $t_0$ at which the cutting operation of the machine tool starts. The feedback capacitors $C_1$ and $C_2$ are set in the discharge reset state. The charges generated by the assembly loads on the transducers 10-5 and 10-6 are discharged and reset, thereby setting the output voltage to 0 V. In this state, when the reset switches 106-1 and 106-2 are turned off at time $t_0$ to start the cutting operation of the machine tool, the output voltage increases due to the drift occurring with the lapse of time. Subsequently, when the cutting operation is started at time $t_1$, the cutting load in such a direction as to increase the assembly load is applied to the transducer 10-5, so that the output voltage of the charge amplifying circuit 100-1 increases in accordance with the cutting load. At the same time, the cutting load is applied to the transducer 100-2 in such a direction as to decrease the assembly load and the output voltage of the charge amplifying circuit 100-2 decreases in accordance with the cutting load.

Figure 19C:
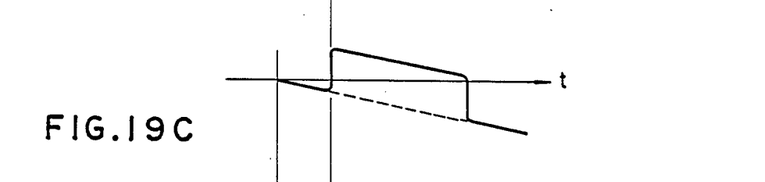
Figure 19D:
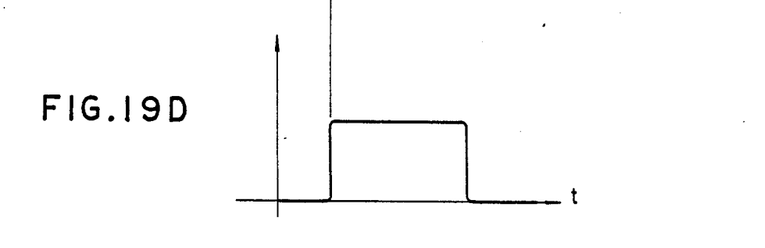

The output voltage of the charge amplifying circuit 100-1 in FIG. 19A is directly input to the adding circuit 108. On the other hand, the output voltage of the charge amplifying circuit 100-2 is inverted by the inverting circuit 110 and becomes an inversion signal as shown in FIG. 19C and is issued to the adding circuit 108. Thus, the adding circuit 108 produces an addition output shown in FIG. 19D in which the output voltage of FIG. 19A and the inverted voltage of FIG. 19C have been added. The drift components due to the lapse of time are set off. Further, the output voltage to which the output voltage due to a change in cutting load was added can be obtained. That is, since the charge amplifying circuits 100-1 and 100 2 have the same circuit arrangement, the drift components generated with the lapse of time also coincide. By inverting one of the drift components and adding it to the other, the drift components can be almost completely set off.

In the adding circuit 108, the inverted output of the charge amplifying circuit 100-2 is added to the output of the charge amplifying circuit 100-1. However, it is also possible to calculate the weighted mean of both of the outputs.

On the other hand, in the embodiment of FIGS. 16 and 18, the transducers 10-5 and 10-6 are provided for the feed nut of the feed screw mechanism of the work table or the supporting bearing. However, the transducers may be also provided for the feed nut of the feed screw mechanism of the main shaft system or the supporting bearing.

What is claimed is:

1. A load detecting apparatus for detecting cutting resistance or a cutting force applied to a machine tool, comprising:

two transducers comprising film sheet type piezoelectric sensors, said sensors generating charges corresponding to loads applied to the transducers, respectively;

a load detecting mechanism in which said two transducers are arranged in a manner in which a load applied in a predetermined direction in the load detecting mechanism increases the load on one of the transducers and reduces the load on the other of the transducers;

charge amplifying circuits operatively connected to said two transducers, respectively, said circuits converting charges generated by the piezoelectric sensors of the transducers into voltage signals indicative thereof;

inverting means operatively connected to one of said charge amplifying circuits for inverting the output voltage signal thereof; and an adding circuit operatively connected to said charge amplifying circuits and to said inverting means, said adding circuit adding an output of said one of said charge amplifying circuits inverted by said inverting means to the output of the other of said charge amplifying circuits.

2. An apparatus according to claim 1, wherein said load detecting mechanism comprises a nut member having opposite ends, metal fittings fastening said transducers to the ends of said nut member, respectively.

3. An apparatus according to claim 1, wherein said load detecting mechanism comprises a bearing unit having an outer ring and attaching means fixing the transducer to the outer ring of the bearing unit 4. A load detecting apparatus for detecting a cutting resistance or a cutting force applied to a machine tool, comprising:

a transducer comprising a film sheet type piezoelectric sensor; and an adaptor for securing a cutting tool such as a drill bit, tap, or the like to a tool holder, said adaptor having a bearing portion therein including a pair of thrust bearings between which said transducer is interposed, and rotation preventing means for preventing portions of said thrust bearings between which the transducer is interposed from rotating.

5. A transducer for detecting a cutting resistance or a cutting force applied to a machine tool, comprising:

a film sheet type of piezoelectric sensor comprising a piezoelectric material having opposed surfaces, and electrode layers extending over the opposed surfaces of the piezoelectric material;

an insulative member disposed over, covering and fixedly attached to the electrode layers of said piezoelectric sensor; and said sensor having a through hole extending therethrough at the center thereof and through the center of said insulative sheet member, said piezoelectric sensor being divided into four discrete parts thereof each of which generates charges corresponding to the load applied thereto, said discrete parts being spaced symmetrically around the center of said sensor.

* * * * *